June 6, 1961

M. NAIMAN 2,987,582

MULTICHANNEL MAGNETIC ERASING HEADS

Filed Aug. 12, 1955

INVENTOR.
MARK NAIMAN
BY
Charles C. English
AGENT

United States Patent Office 2,987,582

Patented June 6, 1961

2,987,582

MULTICHANNEL MAGNETIC ERASING HEADS

Mark Naiman, Philadelphia, Pa., assignor to Sperry Rand Corporation, New York, N.Y., a corporation of Delaware Filed Aug. 12, 1955, Ser. No. 528,053
11 Claims. (Cl. 179—100.2)

Figure 1:
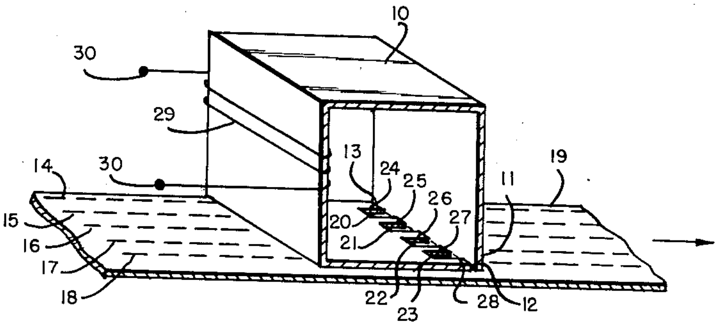

The present invention relates to magnetic recording devices, and is more particularly concerned with improved magnetic transducers for selectively erasing a plurality of channels on a magnetic storage medium.

In magnetic recording applications, for instance of the types wherein magnetic tape or drums are employed for the storage of information, such information is often recorded on the storage medium in a plurality of distinct substantially parallel tracks or channels. It is ordinarily required selectively to erase information so recorded; and in the past, erasing heads capable of performing such an erasing function have comprised structures uniformly erasing the entire storage medium without regard to the track or channel disposition therein.

It will be appreciated that in certain circumstances, it is highly desirable to erase the information tracks only; or to erase portions of the record medium disposed intermediate such information channels. This is especially the case when it is desired to erase preselected ones of such information channels, or preselected intermediate portions of the record medium therebetween, without disturbing the information contained in other information channels disposed between channels being erased. When such erasing has been effected in the past, the plural channels to be erased have been associated with a plurality of independent erasing heads respectively disposed adjacent those channels. This latter structure has required relatively complex and costly transducers for accomplishing multichannel erasing.

The present invention provides a multichannel erasing head capable of erasing preselected information channels or preselected portions of a record medium disposed intermediate such channels, and comprises a unitary erasing head structure which is much simpler and less costly to fabricate and which is considerably less complex in structure than known multichannel erasing heads utilized heretofore.

It is accordingly an object of the present invention to provide improved multichannel erasing heads.

A further object of the present invention resides in the provision of an erasing head for use in magnetic recording systems which is simpler in construction and less costly to provide than has been the case heretofore.

A further object of the present invention resides in the provision of erasing transducers for use in multichannel operations which provide a considerable economy of magnetic material in the transducer structure.

Still another object of the present invention resides in the provision of a unitary multichannel erasing head capable of selectively erasing spaced portions of a magnetic record without disturbing information recorded intermediate such spaced portions.

Still a further object of the present invention resides in the provision of an improved multichannel erasing head having better operating characteristics than has been the case heretofore.

In providing for the foregoing objects and advantages of the present invention, a multichannel erasing head in accordance with the present invention may comprise a relatively wide sheet of magnetic material bent into the configuration of a ring-type head having a width at least as wide as a total width to be erased. The opposed ends of the said sheet of material are placed closely adjacent one another, but are spaced from one another to define an elongated magnetic gap disposed substantially transverse to the plurality of channels to be erased; and one end of the said sheet includes a plurality of substantially parallel slots whereby the said one end of the magnetic sheet is toothed in configuration. The configuration is such, therefore, that a single tooth of magnetic material, formed by the aforementioned slots, is disposed substantially colinear with a predetermined portion, such as an information channel, of a magnetic record medium whereby those portions of the said record medium having teeth adjacent thereto are erased and intermediate portions of the record medium adjacent the said slots are not erased. The transducer so formed is therefore capable of a wide facility of operation by appropriate positioning of the teeth in one end of the said sheet of magnetic material; and in addition, comprises an extremely simple structure capable of ready and inexpensive fabrication inasmuch as most of the transducer structure is common to all the channels being erased.

It will be appreciated from the foregoing, as well as from the subsequent description, that a preferred embodiment of the present invention comprises the production of a multichannel magnetic erasing transducer from a single sheet of magnetic material; but it must be emphasized that the concepts of the present invention, namely, the provision of a plurality of tooth-like pole pieces cooperating with a further substantially planar pole piece and with a common return path structure, may be applied to other forms of magnetic transducers without departing from the spirit of the present invention.

Figure 2:
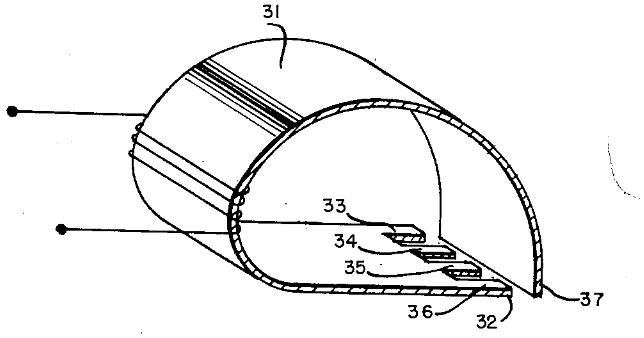

The foregoing objects, advantages, construction and operation of the present invention will become more readily apparent from the subsequent description and accompanying drawings, in which:

FIGURE 1 illustrates a magnetic recording system employing an improved multichannel erasing head constructed in accordance with a preferred embodiment of the present invention; and FIGURE 2 illustrates a multichannel erasing head constructed in accordance with a possible modification of the present invention.

Referring now to FIGURE 1, it will be seen that an inexpensive multichannel erasing head may be formed by bending an elongated relatively wide sheet of magnetic material 10 into a substantially closed ring configuration thereby to define a ring-type head. The opposed ends 11 and 12 of the elongated sheet of material 10 are disposed closely adjacent but in spaced relationship to one another thereby to define an elongated magnetic gap 13 which is substantially transverse to a plurality of information channels 14 through 18 disposed along a magnetic record medium 19. The record medium 19 has been illustrated as a tape, but it will be appreciated that this is meant to be a generic representation only and that the said record medium may, for instance, comprise a drum having a magnetic surface for the storage of information therein.

The end 12 of the elongated sheet 10 is slotted at a plurality of points 20 through 23 in directions substantially orthogonal to the elongated gap 13 thereby to define a plurality of projecting teeth 24 through 28, each of which overlies and is substantially colinear with one of the channels 14 through 18 to be erased. The opposite end 11 of member 12 terminates in the plane of the teeth 24 through 28 so that the gap formed between the ends 11 and 12 is essentially parallel to the surface to be erased. In practice, the width of the sheet 10, and therefore the length of gap 13, is at least equal to the total width of the magnetic material 19 to be erased; and by suitably locating the several slots 20 through 23, and by appropriately selecting the number of such slots, a plurality of erasing teeth, such as 24 through 28, will be defined adjacent those portions of the medium 19 to be erased. It will further be appreciated that the teeth, such as 24 through 28, may be of the same width, or of different widths, and may be uniformly or non-uniformly spaced from one another, depending upon the nature of information to be erased from the medium 19. The elongated sheet 10 has a coil 29 wound thereon and the opposing terminals 30 of this coil may be coupled to a suitable source of A.C. erasing potential, in accordance with known erasing techniques.

When an erasing head is formed by a single sheet of magnetic material bent and slotted in the manner described above and illustrated in FIGURE 1, the several toothed portions, such as 24 through 28 of the end 12 of the said medium 10, comprise a first plurality of pole pieces; while the end 11 of the said sheet 10 acts as a second pole piece common to each of the tooth-like pole pieces 24 through 28. In addition, the portion of the magnetic sheet 10 disposed between the teeth 24 through 28 and the end 11 acts as a common return path structure for the said first plurality of pole pieces and the said second pole piece. As a result, the magnetic paths for the over-all transducer structure are provided by a single unitary structure common to the great majority of the erasing paths; and which portions of the gap 13 are operative in providing erasing fields are determined by the disposition of slots such as 20 through 23.

The particular configuration of erasing head illustrated in FIGURE 1 is substantially rectangular in cross-section, but other forms of erasing heads may be provided in accordance with the present invention. Thus, referring to FIGURE 2, it will be seen that rather than bending the elongated sheet into a rectangular configuration, the said sheet, such as 31, may be arcuately bent. The sheet may again be slotted at one of its ends 32 to define a plurality of toothed pole pieces 33 through 36 cooperating with portions of an information medium to be erased. The other end 37 of the said sheet 31 is not slotted, thereby to provide a pole piece common to each of the tooth-like pole pieces 33 through 36.

In the various embodiments of the invention thus far described, the sheets of magnetic material 10 and 31 are assumed to be self-supporting in nature. It will be appreciated that internal or external supporting structures of non-magnetic material may be provided if desired to lend additional support to the over-all transducer structure; and in addition, the sheet of magnetic material, such as 10 and 31, may comprise a material which is not self-supporting, such as a foil, in which event the normally non-self-supporting magnetic material may be disposed, for instance by an adhesive, on the external or internal surfaces of a non-magnetic supporting structure.

Other modifications will be suggested to those skilled in the art, and in particular, it will be appreciated that the concept of providing toothed pole pieces cooperating with an untoothed common pole piece, and with a common flux return structure, may be practiced in other forms of magnetic transducers. The foregoing description is, therefore, meant to be illustrative only and should not be considered limitative of my invention, and all such variations as are in accord with the principles described, are meant to fall within the scope of the appended claims.

Having thus described my invention, I claim:

1. In a multichannel magnetic transducer for use in erasing selected portions of a multichannel magnetic recording surface, a plurality of first pole pieces, each of said first pole pieces being of thin relatively wide planar configuration, said first pole pieces being disposed in substantially coplanar relation with one another and being spaced from one another in accordance with the spacing of a plurality of distinct magnetic record channels to be erased on said recording surface, each of said first pole pieces comprising magnetic material, a second thin relatively wide and substantially planar pole piece of magnetic material, said second pole piece being common to each of said first pole pieces, said second pole piece extending adjacent said coplanar first pole pieces and being magnetically spaced from said first pole pieces thereby to define a plurality of gaps between said first pole pieces and said common second pole piece respectively, a common magnetic return path structure of magnetic material between said second pole piece and each of said first pole pieces, the magnetic material of said common return path structure being contiguous with the magnetic material of said second pole piece and with the magnetic material of each of said first pole pieces whereby said return path structure forms an uninterrupted magnetic return path between said common second pole piece and each of said first pole pieces, and unitary energizing coil means carried by said common return path structure for energizing all of said first pole pieces simultaneously thereby to permit simultaneous erasure of selected spaced portions of said recording surface.

2. A multichannel transducer for use with a magnetic record medium, comprising a first magnetic pole piece having a toothed configuration, there being a single tooth respectively adjacent each channel of said magnetic record medium, a second magnetic pole piece having a substantially planar configuration, said second pole piece extending adjacent to and being magnetically spaced from each of the teeth of said toothed first pole piece, a common magnetic return path structure magnetically contiguous with and physically joining said first and second pole pieces, and a common energizing coil carried by said transducer for simultaneously producing flux between said second pole piece and each tooth of said first pole piece, said first and second pole pieces and said common return path structure comprising portions of a unitary elongated sheet of magnetic material disposed in a substantially ring-shaped configuration, the teeth of said first pole piece being disposed in a first plane extending substantially parallel to said magnetic record medium, and said second pole piece being disposed in a second plane extending transverse to said first plane.

3. The erasing head of claim 2 wherein said ring-shaped configuration is substantially rectangular in cross-section.

4. A multichannel erasing head comprising a relatively wide sheet of magnetic material bent to form a ringe-type head at least as wide as a total width to be erased, the opposed ends of said bent sheet of material being closely adjacent to one another and being spaced from one another thereby to define an elongated magnetic gap having a length equal to the width of said sheet, said opposed ends of said bent sheet of material being located respectively in planes extending transverse to one another, one opposed end of said sheet being toothed in configuration adjacent said gap, and a coil of wire carried by said sheet of magnetic material for simultaneously producing flux in each of said teeth.

5. A multichannel magnetic erasing head comprising an elongated unitary sheet of magnetic material bent in a substantially closed loop configuration thereby to form a ring-type head, the width of said sheet being at least as wide as a total width of a record medium to be erased, the opposed integral ends of said elongated bent sheet being disposed closely adjacent to and spaced from one another thereby to define an elongated gap therebetween having a length equal to the width of said sheet, said opposed ends of said sheet being located respectively in first and second planes extending transverse to one another with said first and second planes each terminating adjacent said elongated gap, one of said planes extending substantially parallel to said record medium to be erased and the other of said planes extending transverse to said record medium, one elongated end of said sheet defining a plurality of spaced teeth integrally formed with said sheet, said teeth being disposed substantially parallel to one another in a direction substantially orthogonal to the direction of elongation of said gap, and a coil of wire carried by said sheet of magnetic material for simultaneously producing alternating erasing flux in each of said spaced teeth.

6. The erasing head of claim 5 wherein said bent sheet defines a ring-type head which is substantially rectangular in cross-section.

7. In a magnetic recording system wherein a magnetic storage member has magnetic gradients stored therein in a plurality of elongated substantially parallel tracks, a unitary erasing head for erasing at least some of said tracks while leaving intermediate portions of said storage member relatively unaffected, said unitary erasing head being disposed adjacent said storage member and comprising a first toothed pole piece of magnetic material, there being a single elongated tooth in said toothed pole piece disposed adjacent to and substantially colinear with each of said tracks to be erased, the elongated teeth of said first pole piece extending in spaced relation to one another in a common plane disposed substantially parallel to the said storage member, a second substantially unbroken planar pole piece disposed adjacent said storage member in a direction substantially transverse to all of said plurality of elongated tracks, the plane of said second pole piece being transverse to said common plane of said teeth, said second pole piece being closely adjacent to and spaced from the teeth of said first pole piece thereby to define an elongated gap extending substantially transverse to said plurality of tracks and located between the teeth of said first pole piece and the unbroken plane of said second pole piece, and a common magnetic return path structure magnetically contiguous with and physically joining said second pole piece to each tooth of said first pole piece, said first and second pole pieces and said common return path structures comprising portions of a unitary sheet of magnetic material disposed in a substantially closed loop configuration, said teeth being defined by a plurality of substantially parallel slots formed in one end of said unitary sheet.

8. A multi-channel ring-type magnetic erasing head comprising a unitary sheet of magnetic material bent in a substantially closed configuration to form at its ends first and second magnetic pole pieces closely adjacent one another so as to define an elongated magnetic gap therebetween, said first pole piece including a plurality of slots extending substantially at right angles to said elongated gap whereby said first pole piece defines a toothed configuration adjacent said gap, said second pole piece being continuous in configuration, and a common energizing coil carried by said unitary sheet of magnetic material whereby energization of said coil simultaneously produces erasing flux between said continuous second pole piece and each of the teeth of said first pole piece.

9. A multi-channel transducer for use with a multichannel magnetic record medium, said transducer comprising a first magnetic pole piece structure including a plurality of teeth arranged in a plane with one of said teeth for each channel of said magnetic record medium, a unitary magnetic sheet arranged as a common magnetic return path extending in a bent configuration from one end of each of said teeth to the other end thereof, said sheet providing at one end thereof a common second magnetic pole piece structure that extends transversely to the plane of said first pole piece structure and that is spaced from an end of said teeth to form a transducer gap therewith, a common energizing coil linked to said common return path structure for changing the flux in said gap between said second pole piece structure and the teeth of said first pole piece structure.

10. A multi-channel erase head for use with a multichannel magnetic record medium, said erase head comprising a first magnetic pole piece having a plurality of teeth arranged in a plane with one of said teeth for each channel of said magnetic record medium, a common magnetic return path formed as an integral magnetic sheet bent to extend from one end of said teeth to the other end thereof, said sheet providing at one end thereof a second magnetic pole piece extending transversely to the plane of said first pole piece and spaced from an end of said teeth to form an erase gap, a common energizing coil linked to said common return path structure for producing flux in said gap between said second pole piece and the teeth of said first pole piece.

11. In a magnetic recording system wherein a magnetic storage member has magnetic gradients stored therein in a plurality of elongated substantially parallel tracks and is moved through a certain path, an erasing head for erasing at least some of said tracks while leaving intermediate portions of said storage member relatively unaffected, said erasing head being adapted to be disposed adjacent said storage member path and comprising a first pole piece of magnetic material, said first pole piece including a plurality of teeth each disposed adjacent to said path to be substantially colinear with one of said tracks to be erased, said teeth of said first pole piece extending in spaced relation in a common plane, a second pole piece formed as a continuous sheet, said second pole piece sheet being disposed adjacent said storage member path and extending in a direction transverse to said common plane of said teeth, an end of said second pole piece being closely adjacent to and spaced from the teeth of said first pole piece so as to define an elongated gap extending substantially transverse to said plurality of tracks and located between the teeth of said first pole piece and the sheet of said second pole piece, and a common magnetic return path structure between said second pole piece and the teeth of said first pole piece, said second pole piece and said common return path structure comprising portions of a unitary sheet of magnetic material formed in a loop configuration.

References Cited in the file of this patent

UNITED STATES PATENTS

| | | |
|---|---|---|
| 2,700,588 | Williams et al. | Jan. 25, 1955 |
| 2,734,948 | Mueller | Feb. 14, 1956 |
| 2,766,328 | Handschin et al. | Oct. 9, 1956 |
| 2,785,038 | Ferber | Mar. 12, 1957 |

FOREIGN PATENTS

| | | |
|---|---|---|
| 838,656 | Germany | May 12, 1952 |